United States Patent [19]
Girmay

[11] Patent Number: 5,473,360
[45] Date of Patent: Dec. 5, 1995

[54] ADAPTIVE METHOD FOR HIGH SPEED DETECTION OF POSITION AND INTENSITY

[75] Inventor: Girmay K. Girmay, La Mirada, Calif.

[73] Assignee: Xerox Corporation, Stamford, Conn.

[21] Appl. No.: 173,014

[22] Filed: Dec. 27, 1993

[51] Int. Cl.$^6$ ........................................................ B41J 2/47
[52] U.S. Cl. .............................................. 347/247; 358/296
[58] Field of Search ...................................... 347/247, 237, 347/251; 358/296

[56] References Cited

U.S. PATENT DOCUMENTS

| | | | |
|---|---|---|---|
| 4,648,119 | 3/1987 | Wingfield et al. | 358/470 |
| 5,369,423 | 11/1994 | Hunter et al. | 347/247 |
| 5,410,414 | 4/1995 | Curry | 347/251 |

*Primary Examiner*—Mark J. Reinhart
*Attorney, Agent, or Firm*—Robert E. Cunha

[57] ABSTRACT

A look ahead circuit for enabling the calibration of a ROS laser to be calibrated during the active part of the scan. A register takes a number of pixels from the stream of video and compares them to a plurality of possible matching pixel patterns. If a match is found, the pixel pattern is applied to a table look up to produce a digital representation of the laser power that should be produced as a result of these pixels, and this representation is converted in a digital to analog converter to an analog voltage which corresponds to the laser power that the laser should be putting out when generating this set of pixels. During the time when these pixels are being printed, a detector measures the laser power and that is compared to the analog voltage to produce a difference. At the same time, a capture circuit, as the result of finding the match, turns on a sample and hold circuit which couples out the difference as the error output, which is used to correct the laser output.

1 Claim, 2 Drawing Sheets

ADAPTIVE METHOD FOR HIGH SPEED DETECTION OF POSITION AND INTENSITY

BACKGROUND OF THE INVENTION

A circuit in a raster output scanner for calibrating a laser's power during the scan. The circuit looks ahead to find particular patterns of OFF and ON pixels, and uses a table look-up to generate reference levels to which the laser output can be compared.

In a typical laser driven raster output scanner (ROS), the laser can be calibrated by measuring the laser power before the regular scan starts, and comparing that measurement to a predetermined reference to control the laser power at a desired power level. However, during the scan, typically after a series of ON or OFF pixels, the laser temperature or power may drift from its rated values. This fluctuation of power results in decreased image quality, and could possibly result in damage to the laser. As a result, during the scan, the laser power in some models is slightly decreased as a function of time since the last calibration to reduce the possibility of damage, with a corresponding decrease of image quality.

A considerable improvement would be gained if the laser were calibrated more frequently, which would necessarily mean that the laser would have to be calibrated during the active portion of the scan. A problem is that the calibration process must measure the power over a number of pixels, and the data during the scan usually is an irregular collection of ON and OFF pulses, which would seem to make any calibration inaccurate. A method for accurately calibrating the laser during the active scan period is needed.

SUMMARY OF THE INVENTION

In this system, instead of sending a stream of image pixels directly to the ROS, they are first temporarily stored in a register. On each clock pulse, the parallel output of the status of all of the locations of the register are used as address bits to a look-up table, and if a group of pixels is one of a number of predetermined patterns, a digital calibration number is output. This is converted in a digital to analog converter, and is used as a new calibration voltage for the laser. At the same time that this calibration voltage is generated, a light detector measures the laser power. A summing junction compares these two voltages and produces an error voltage to correct the laser power, if necessary For a binary system, examples of pixel patterns would be all ZERO's and all ONE's. This same circuit can also be used to calibrate a laser that is designed to output power at multiple levels. For example, if a laser can output power in 10% increments (10%, 20%, etc) then it would be appropriate to calibrate the laser at each level With prior calibration circuits this is difficult since there is a limit to the amount of time available for the calibration of these numerous levels before the start of scan, but with this system, most of the calibrations can be made in the active portion of the scan, and only the levels that were missed during the active portion of the scan need be done during the inactive portion.

The result is that the power levels of the laser can be calibrated, not only at the beginning of the scan, but also at any time during the active portion of the scan when a predetermined bit pattern is observed. This method for fast signal acquisition and processing, based on a look ahead architecture, gives the correction subsystem a substantial over-all performance and speed that would have otherwise been either too expensive or not achievable.

DETAILED DESCRIPTION OF THE INVENTION

Figure 1:
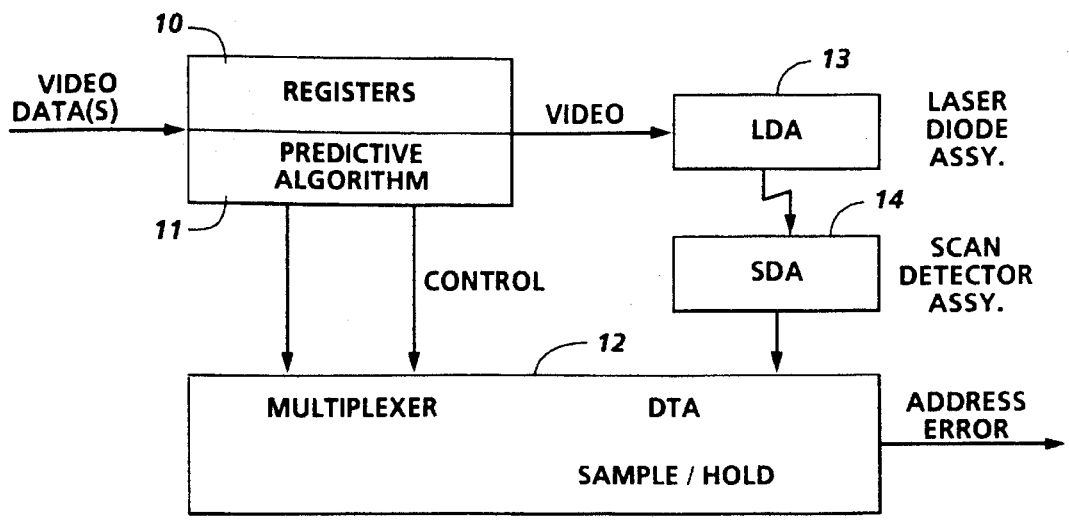
FIG. 1 is a block diagram of the calibration circuit.

With reference to FIG. 1, the video data is a digital representation of the pattern to be printed. A shift register 10 is used to enable the predictivity of the light output. While the data is passed through the registers, its pattern is observed and a decision is made as to the appropriateness of sampling the light output, and if sampling are to be done, exactly when. The algorithm also figures out the weight of the data. As an example of that, assume that the overall speed of the detector in capturing any level of power is a total time of 4 pixels or less. A simple algorithm will be looking for any level that is continuous for 4 pixels or more, and when this pattern occurs, it will select the appropriate sample and hold to capture the data. A portion of the algorithm will keep track of the different levels that have been updated, and those that have not been serviced during the active time of the scan will be sampled in the inactive time.

In FIG. 1, when the algorithm 11 sees a predetermined pattern in the registers 10, the pattern will be passed to the control block 12. In this logic block there is maintained a channel for each power level, and a multiplexer to direct the algorithm output to the correct channel. For the selected channel, the digital pattern is sent to a digital to analog converter to generate an analog voltage, and a sample and hold circuit to hold it. At the same time, the video pattern is sent to the laser diode assembly 13 to enable it to provide the associated laser power output. This power is sensed by the scan detector assembly 14 to produce a signal proportional to the power output, and the two signals are compared in the control block 12 to produce an error signal.

Figure 2:
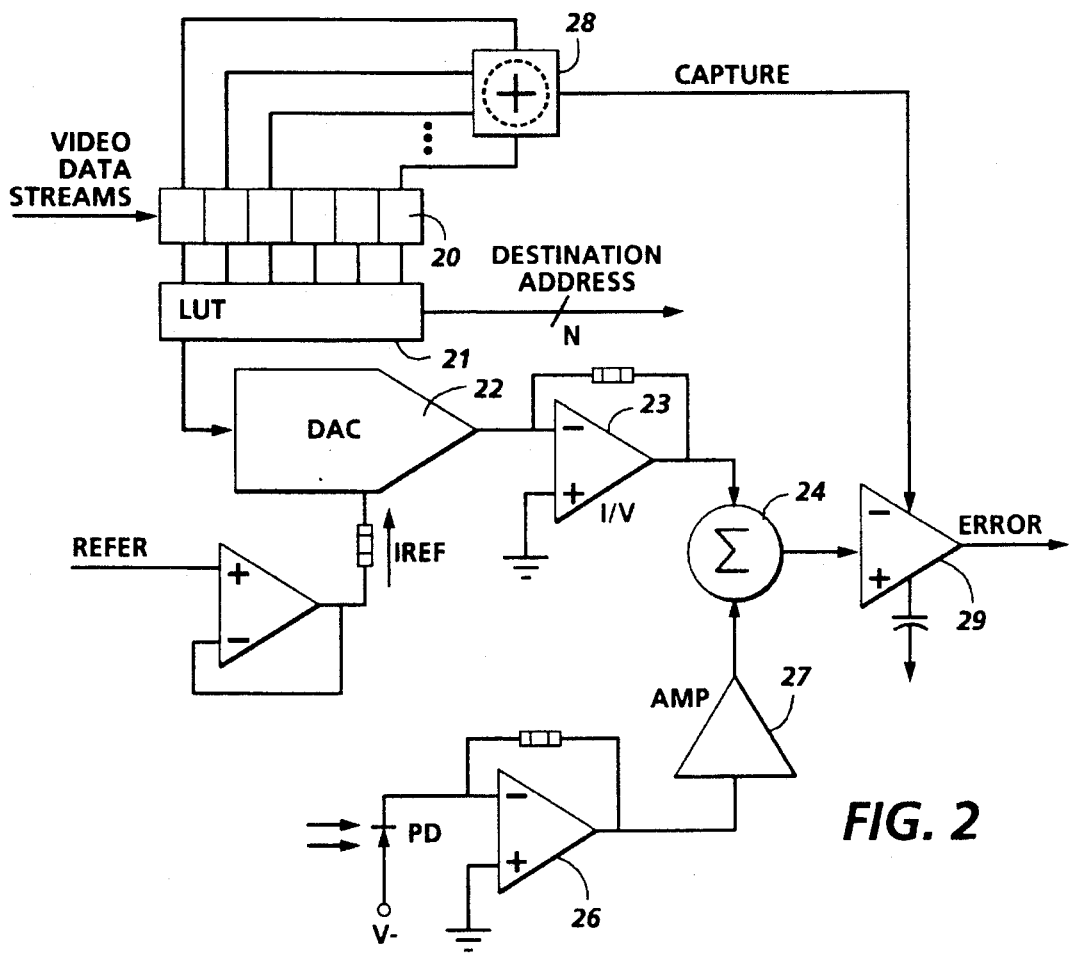
FIG. 2 is a more detailed diagram of the circuit.

This circuit is shown in more detail in FIG. 2. The video stream enters the register 20. In this diagram the register is shown as storing six pixels. Of course, more or less pixels can be used, and also, a subset of the number of pixels in the register may also be used to determine a pattern for generating a correction cycle. In addition, each pixel may be one bit, or a number of bits that represent a number of possible laser power output settings.

The states of all of the bit locations are sent to a look up table 21, which has been programmed so that only the predetermined patterns will result in an output. These patterns may be all ZERO's or all ONE's in a binary system, all the same percentages in a variable level system, or any other predetermined pattern that has been determined to be useful for calibrating the laser. The output of the look up table is converted to an analog voltage in a digital to analog converter 22, the output of which is applied through an amplifier to a summing junction 24.

At this time, the laser power is detected by the light sensor 25, the output of which is coupled through amplifiers 26 27 to the same summing junction. Here the actual and predetermined power levels are compared and the difference is generated. At the same time, the data bits that were sent to the lookup table are coupled to a capture circuit 28, and if a match is found between one of the stored data patterns and the bits in the video stream, a signal is sent to the sample and hold circuit 29 to capture the output voltage from the junction 24 and send that out as the error signal.

Figure 3:
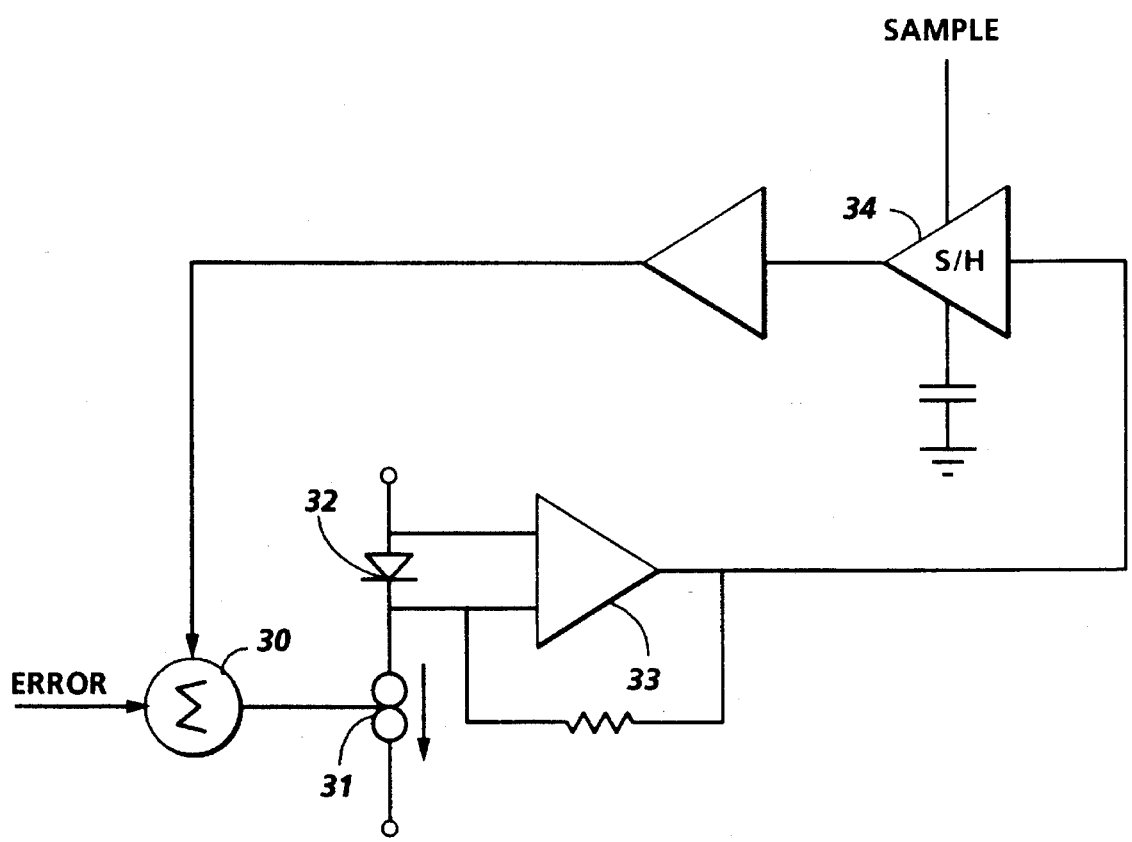
FIG. 3 is a diagram of a laser that can be used in conjunction with this calibration circuit.

This error signal can be used to control the laser power as shown in FIG. 3. The error signal is applied through an inner loop summing junction 30 to a current generator which drives the laser 32. The voltage across the laser is monitored by amplifier 33, and sampled by sample and hold device 34, the output of which is applied back to the summing junction 30. The actual voltage as measured at the laser and the reference voltage applied to the summing junction as the error voltage are compared, and the result is applied to the current generator 31.

The overall result of this system is that the laser output can be calibrated frequently at various power levels during the active portion of the scan using actual data in real time.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

I claim:

1. In a raster output scanner having a laser for generating light representing a stream of video data pixels, a circuit for generating an error signal between the actual power output of said laser and a predetermined value, comprising:

a register having a plurality of storage locations for capturing a number of pixels in said stream, a look up table responsive to the states of said locations for producing an output, a digital to analog converter for converting said look up table output to an analog voltage, a detector for measuring the power output of said laser, a summing junction responsive to said detector for comparing said measured laser power output and said analog voltage to produce a difference, a capture circuit which compares the bit pattern of said pixels in the register to a number of stored patterns to find a match, and a sample and hold circuit responsive to the output of said capture circuit to output said difference as said error signal.

* * * * *